United States Patent Office 2,811,506
Patented Oct. 29, 1957

2,811,506
FORMYL END-BLOCKED METHYL HYDROGEN SILOXANE

Gus L. Constan, Midland, Mich., assignor to Dow Corning Corporation, Midland, Mich., a corporation of Michigan No Drawing. Application June 14, 1954,
Serial No. 436,695

1 Claim. (Cl. 260—46.5)

This invention relates to organosiloxane compositions.

It is the primary object of this invention to prepare novel organosiloxanes which are useful as water repellents when applied to textiles and the like, and which are useful as intermediates in the preparation of other compositions.

This invention relates to organosiloxanes of the general formula

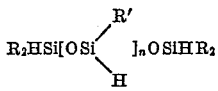

where R is selected from the group consisting of monovalent hydrocarbon radicals, alkoxy radicals and acyloxy radicals, and R′ represents monovalent aliphatic hydrocarbon radicals, and $n$ is an integer of at least 10.

The compositions of this invention are non-volatile polymers and copolymers of the formula

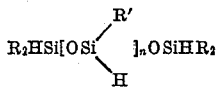

The organic radicals, designated as R′, attached to the silicons in the repeating unit

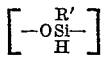

are monovalent aliphatic hydrocarbon radicals such as alkyl, e. g. methyl, ethyl, propyl and octadecyl, and alkenyl, e. g. vinyl, allyl, and octadecenyl.

The organosiloxane compositions of this invention are end blocked with units of the formula R$_2$HSi— in which R represents monovalent hydrocarbon radicals, and/or alkoxy groups and/or acyloxy groups. These end-blocking units can contain more than one type of R group. Illustrative of the organic radicals represented by R are ethyl, propyl, octadecyl, phenyl, diphenyl, anthracyl, tolyl, xylyl, methylnaphthyl, phenylethyl, benzyl, allyl, vinyl, methoxy, ethoxy, butoxy, acetoxy, propionoxy and stearyloxy.

The particular method of preparing the compositions of this invention is not critical. The cohydrolysis and condensation of small amounts of a diorganohydrogenchlorosilane with a monoorganohydrogendichlorosilane will produce the compositions of this invention. Another method is to employ a Grignard reagent such as, for example, CH$_3$MgCl, C$_2$H$_5$MgBr, and C$_6$H$_5$MgCl. The Grignard reagent is added to the monoorganohydrogendichlorosilane in amount of not more than 1 mol of the former to 5 mols of the latter and then the mixture is hydrolyzed. Alternatively, an organic alcohol or an organic acid may be employed in the same mol ratios to provide end groups for an organohydrogendichlorosilane.

The compositions of this invention are excellent for imparting water repellency to fabrics. Fabrics properly treated with these compositions exhibit excellent water repellency and retain this quality after repeated washings and/or dry cleanings.

The following examples will serve to give those skilled in the art a better understanding of this invention. All examples are merely illustrative and are not to be construed as limiting the invention, the scope of which is properly delineated in the appended claim.

*Example 1*

1.84 mol percent diethylhydrogenchlorosilane was added to 98.16 mol percent methylhydrogendichlorosilane and sufficient toluene to prepare a 50 percent by volume solution of chlorosilanes in toluene. This mixture was added slowly and with continuous agitation to water. Sufficient water was present to completely hydrolyze the chlorosilanes, to keep the HCl concentration below 3 percent by weight and to keep the temperature below 25° C. A two-phase solution resulted and the hydrolyzed chlorosilanes in toluene were separated therefrom. This solution was washed free of acid by washing first with water and then with two washes of a one percent solution of NaHCO$_3$ and finally two washes with water. It was considered to be acid-free when the wash water tested alkaline to Bromcresol purple indicator. The reaction product was separated from the toluene solvent and volatiles by stripping to 178° C. at a pressure of 29 mm. of mercury with CO$_2$ bubbled through the liquid. The distillates were discarded and the non-volatile organosiloxane remaining after distillation was the desired (C$_2$H$_5$)$_2$HSi[OSiHCH$_3$]$_n$OSiH(C$_2$H$_5$)$_2$. The product was 58.9 percent by weight of the theoretical yield and had a viscosity of 30.9 cs. at 25° C. The product gelled in 3 hours 15 minutes at 150° C., had a flash point of 118.3° C., and a density at 25° C. of 1.3967. The organosiloxane was put into a water emulsion containing 40 percent by weight solids. Samples of spun rayon and acetate, nylon, cotton, and acetate were dipped in the emulsion. The solvent was removed by air drying and the organosiloxane was cured in situ by heating from 110° C. to 250° C. for 5 to 20 minutes. The fabrics were then subjected to a standard spray test [set forth in Am. Dyestuffs Rep., vol. 30, p. 7 (1941)] wherein 250 milliliters of water flowing from a spray cap impinge on a piece of the material being tested set at an angle of 45 degrees, six inches below the water source. Each of the treated fabrics had the maximum spray rating of 100 when tested before washing and/or dry cleaning. After 3 washings, the spun acetate and rayon cloth had a good spray rating of 80 and 3 dry cleanings of this fabric reduced the spray rating only to 80–90. Washing the treated nylon fabric three times reduced the water repellency to 50 but dry cleaning reduced it only to 70. The cotton sample retained a remarkable degree of water repellency having a spray rating of 80 after three dry cleanings and 70 after 3 washings. The treated acetate showed excellent retention of water repellency having a spray rating of 80 after 3 dry cleanings and 50 after 3 washings. The composition of this example was in all ways satisfactory for use as a water repelling treatment for fabrics.

*Example 2*

Employing the method of Example 1 with 1.96 mol per cent ethylmethylhydrogenchlorosilane and 98.04 mol per cent methylhydrogendichlorosilane,

C$_2$H$_5$(CH$_3$)HSi[OSiHCH$_3$]$_n$OSiH(CH$_3$)C$_2$H$_5$ was prepared. The yield was 62.7 percent of theory. The product had a viscosity of 24.6 cs. at 25° C., a gel time of 1¼ hours at 150° C., a flash point of 126.7° C., and a density at 25° C. of 1.394. The reaction product was emulsified in water with toluene and perchloroethylene as emulsifying agents, to 40 percent by weight organosiloxane in water. Test samples of spun rayon and acetate, nylon, cotton and acetate cloth were treated with the organosiloxane-water emulsion as noted in Example 1. The rayon and acetate cloth had an initial spray rating of from 90 to 100. After three dry cleanings in Stoddard solvent it retained a spray rating between 80 and 90. The treated nylon cloth had an initial spray rating of 90 to 100 and remained at 90 after three dry cleanings. Similarly excellent results were achieved with the treated cotton cloth, and the acetate cloth had an initial spray rating of 100 and dropped only to 90 after three dry cleanings. The composition of this example was in all ways satisfactory for use on cloth and imparted excellent water repellency to cloth treated with it.

Example 3

An ethylmagnesiumbromide Grignard reagent was prepared. 1.51 mol percent of said Grignard was added slowly to 98.49 mol percent of methylhydrogendichlorosilane and toluene. During the addition of the Grignard reagent, the mixture was constantly stirred and cooled below 25° C. The entire mixture of chlorosilane and magnesium chloride in 50 percent by volume of toluene was added slowly with constant stirring to water. Sufficient water was employed to insure the complete hydrolysis of the chlorosilanes while at the same time keeping the HCl concentration below 3 percent by weight and the temperature was kept below 25° C. The desired reaction product was in the less dense phase of the resulting two-phase system. The less dense phase was separated from the water phase and was washed free of acid by agitating it with water followed by two washes with 1 percent $NaHCO_3$ and finally two washes with water. After the final wash, the wash water tested alkaline to Bromcresol purple indicator. The product was stripped of solvent and volatiles by heating to 181° C. at a pressure of 27 mm., with $CO_2$ bubbled through the mixture during the stripping process. The stripped-off distillate was discarded. The remaining non-volatile organopolysiloxane was identified as

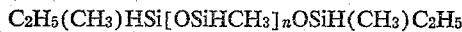
$C_2H_5(CH_3)HSi[OSiHCH_3]_nOSiH(CH_3)C_2H_5$

This product was found to have a viscosity of 33 cs. at 25° C. and a gel time at 150° C. of 2 hours, a flash point of 149° C., and a density at 25° C. of 1.397. 60 parts by weight of the reaction product were admixed with 40 parts by weight of a dimethylsiloxane fluid having a viscosity of 12,500 cs. at 25° C., and emulsified to 40 percent solids in water employing a liquid fatty amide condensation product available commercially as Pluramine S-100 as an emulsifying agent. Rayon-acetate cloth treated with the reaction product of this example as outlined in Example 2 had an initial spray rating of 90 and no significant change in the water repellency was noted after 3 dry cleanings. Nylon cloth treated and tested in the same way had an excellent initial spray rating which was unchanged after 3 dry cleanings. Cotton cloth treated as outlined in Example 2 had an initial spray rating of 100 and retained a spray rating of 90 after 3 dry cleanings. The acetate cloth had an initial spray rating of 100 and no significant reduction in water repellency was noted after 3 dry cleanings. The liquid organosiloxane of this example was in every way satisfactory for use as a water repellent on textiles.

Example 4

Employing the method of Example 1, the composition

$(n-C_6H_{13}O)CH_3HSi[OSiHCH_3]_nOSiHCH_3(n-C_6H_{13}O)$ was prepared from 1.75 mol percent of n-hexyl alcohol and 98.25 mol percent of methylhydrogendichlorosilane. The yield was 42 percent of theory and the organosiloxane had a viscosity of 25 cs. at 25° C., a gel time at 150° C. of 3.5 hours, a flash point of 126.6, a density at 25° C. of 1.3968 and a specific gravity of 1.015. The four types of cloth employed in the preceding examples were also used herein. Each cloth sample was dipped in an emulsion containing 40 percent solids composed of 60 percent by weight of the reaction product of this example and 40 percent by weight of a dimethylsiloxane having a viscosity of 12,500 cs. at 25° C. using an amine condensate synthetic detergent available commercially as Wooncopen G. W. as an emulsifying agent. The treated spun acetate and rayon cloth had an initial spray rating of 100 and this was reduced only to 80 after 3 washings and only to 90 after 3 dry cleanings. The treated nylon cloth lost none of its initial spray rating of between 90 and 100 after 3 dry cleanings and it still had a spray rating of between 70 and 80 after 3 washings. The treated cotton cloth and the treated acetate cloth were equally exceptional in water repellency each having an initial spray rating of 100 which was reduced no lower than between 80 and 90 after 3 washings or 3 dry cleanings. This alkoxymethyl end-blocked methylhydrogensiloxane was excellent for use as water repellent on textiles having superior durability to washing and dry cleaning.

Example 5

Employing the method of Example 1 with 2.12 mol percent of formic acid and 97.888 mol percent of methylhydrogendichlorosilane the composition $CH_3(HCOO)HSi[OSiCH_3H]_nOSiH(OOCH)CH_3$ was prepared. A yield of 63.9 percent of theory was obtained. The reaction product had a viscosity of 37.3 cs. at 25° C., a gel time at 150° C. of 1-1¼ hours, a flash point of 210° C., and a density at 25° C. of 1.3965. Cloth samples of acetate and rayon, nylon, cotton, and acetate were treated with the organosiloxane emulsion as in Example 1. These treated samples exhibited excellent water repellency and retained this quality after washing and dry cleaning.

Example 6

Equivalent results are obtained when methyl magnesium chloride is reacted with methylhydrogenchlorosilane and the method set forth in Example 3 is employed.

That which is claimed is:

$CH_3(HCOO)HSi[OSiCH_3H]_nOSiH(OOCH)CH_3$ where $n$ is an integer of at least 10.

References Cited in the file of this patent

UNITED STATES PATENTS

| | | |
|---|---|---|
| 2,507,414 | MacKenzie et al. | May 9, 1950 |
| 2,588,366 | Dennett | Mar. 11, 1952 |
| 2,588,393 | Kauppi | Mar. 11, 1952 |
| 2,645,629 | Nitzsche et al. | July 14, 1953 |
| 2,750,305 | Gargarine et al. | June 12, 1956 |